(12) United States Patent
Barnett

(10) Patent No.: US 7,578,553 B2
(45) Date of Patent: *Aug. 25, 2009

(54) BICYCLE SEAT CLAMP

(76) Inventor: Robert L. Barnett, 1428 E. Borchard, Santa Ana, CA (US) 92705

(*) Notice: Subject to any disclaimer, the term of this patent is extended or adjusted under 35 U.S.C. 154(b) by 0 days.

This patent is subject to a terminal disclaimer.

(21) Appl. No.: 11/694,773

(22) Filed: Mar. 30, 2007

(65) Prior Publication Data

US 2007/0177934 A1     Aug. 2, 2007

Related U.S. Application Data

(63) Continuation of application No. 11/417,663, filed on May 3, 2006, now abandoned, which is a continuation of application No. 10/795,070, filed on Mar. 5, 2004, now Pat. No. 7,080,879.

(60) Provisional application No. 60/494,188, filed on Aug. 11, 2003, provisional application No. 60/452,641, filed on Mar. 6, 2003.

(51) Int. Cl.
*B60N 2/38* (2006.01)

(52) U.S. Cl. ............... 297/195.1; 297/215.13; 297/215.14

(58) Field of Classification Search ........... 297/195.1, 297/215.14, 215.13; 403/364, 373, 374.1, 403/409.1, 110, 309, 310, 311
See application file for complete search history.

(56) References Cited

U.S. PATENT DOCUMENTS

| 4,568,121 | A | * | 2/1986 | Kashima | ............... 297/215.15 |
| 5,755,488 | A | * | 5/1998 | Beda et al. | ................. 297/337 |
| 5,927,801 | A | * | 7/1999 | Miree | ...................... 297/195.1 |
| 6,561,578 | B1 | * | 5/2003 | Mel | ........................ 297/195.1 |
| 7,080,879 | B2 | * | 7/2006 | Barnett | .................. 297/215.14 |

OTHER PUBLICATIONS

Declaration of Robert L. Barnett & Scott Hart.
Declaration of Jerome Mezzasalma & Jeffery Christman.

* cited by examiner

*Primary Examiner*—Sarah B McPartlin
(74) *Attorney, Agent, or Firm*—Knobbe, Martens, Olson & Bear, LLP

(57) ABSTRACT

A bicycle seat clamp arrangement including a bicycle seat having a mounting beam extending lengthwise on an underneath side of the bicycle seat and defining a first surface. A clamp assembly is configured to apply a clamping force to the mounting beam and defines a second surface. The first and second surfaces are configured to interlock in order to inhibit relative fore and aft movement of the bicycle seat and the clamp arrangement. In one arrangement, the surfaces comprise a plurality of interlocking gear teeth. In another arrangement, the surfaces comprise a corresponding plurality of projections and depressions. The first and second surfaces may cooperate to form a wedge configuration to inhibit rocking of the bicycle seat relative to the clamp assembly.

3 Claims, 7 Drawing Sheets

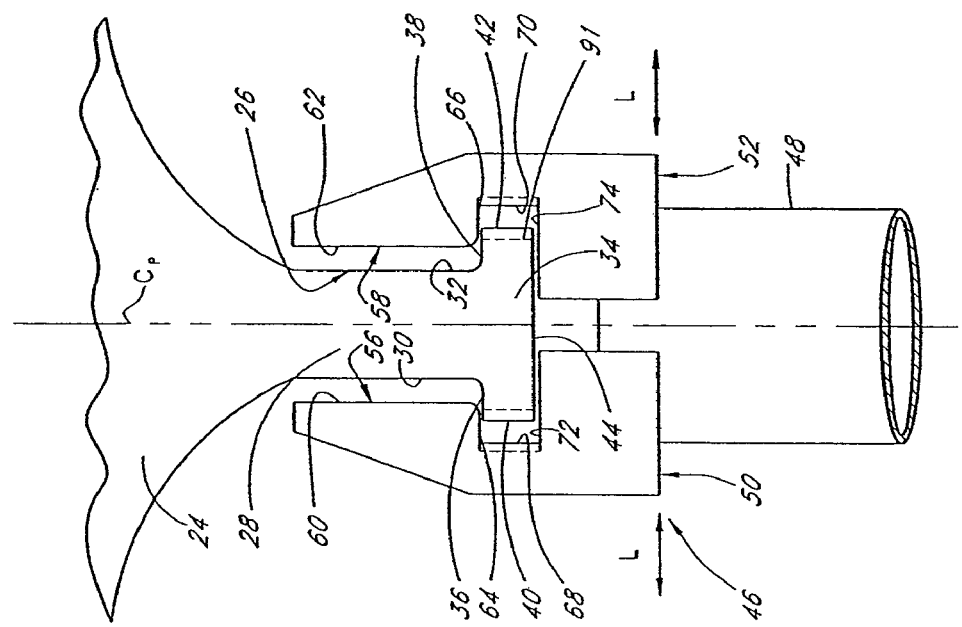
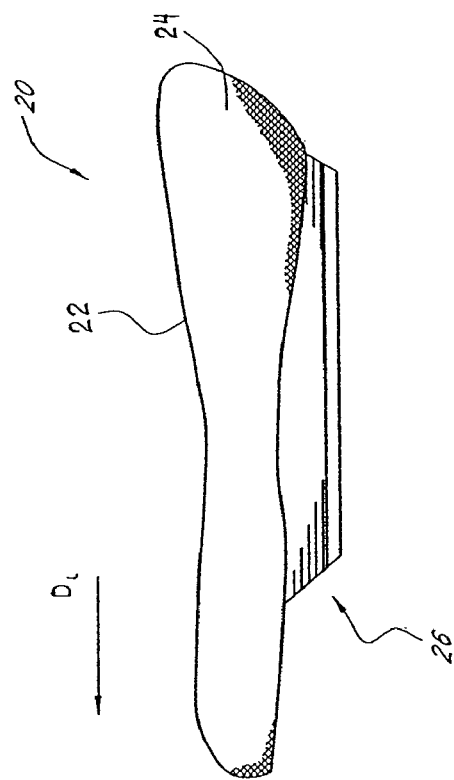

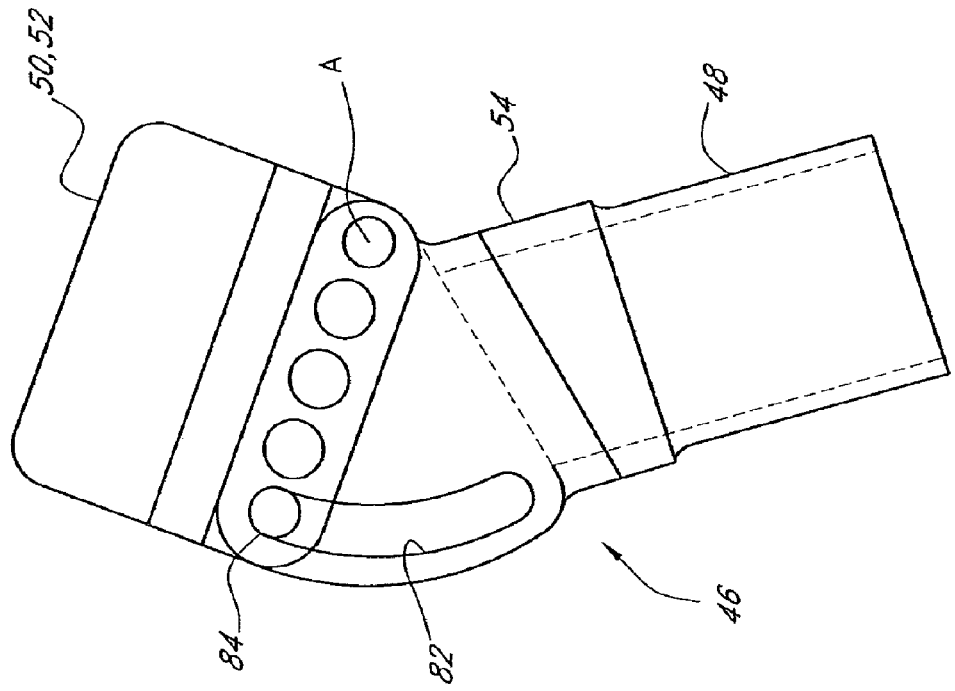
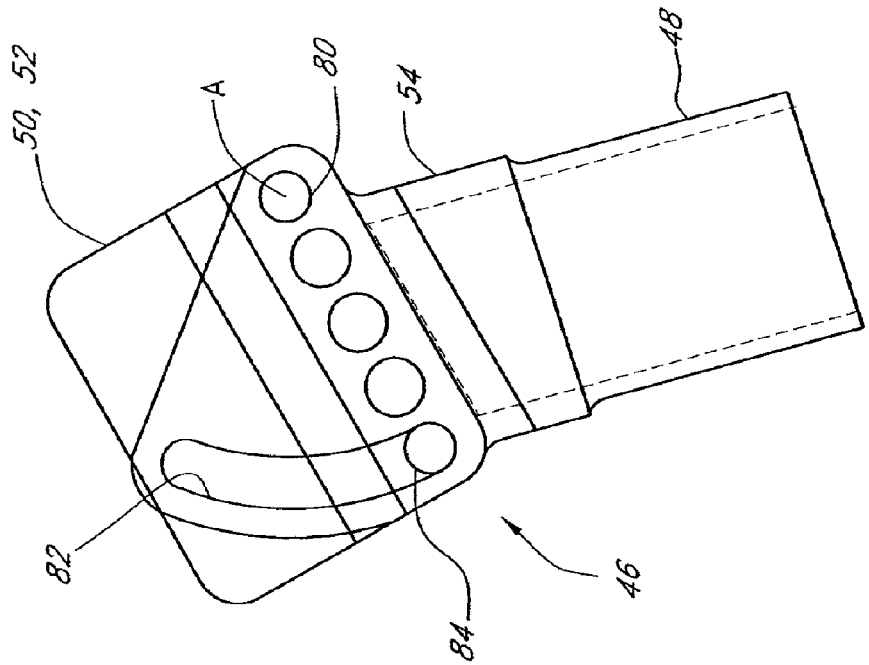

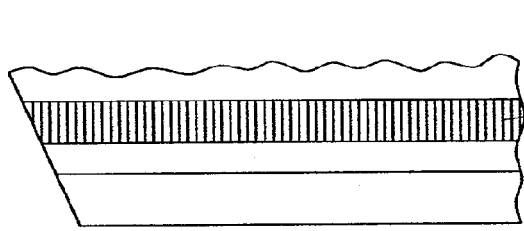
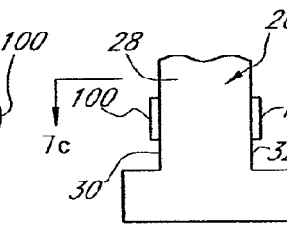
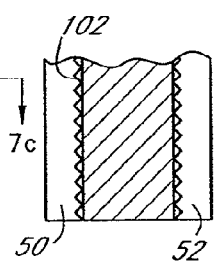
FIG. 7A     FIG. 7B     FIG. 7C
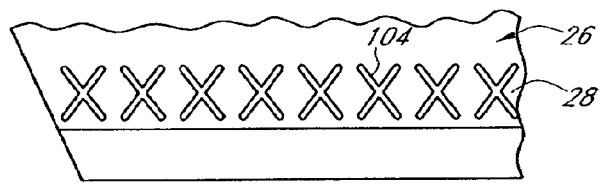
FIG. 8
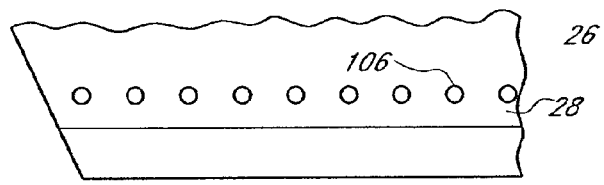
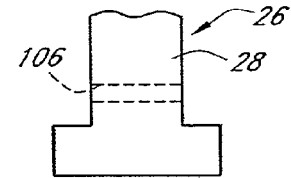
FIG. 9A     FIG. 9B
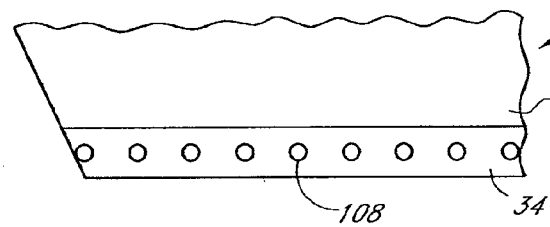
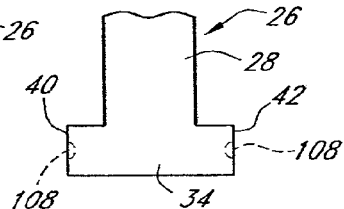
FIG. 10A     FIG. 10B

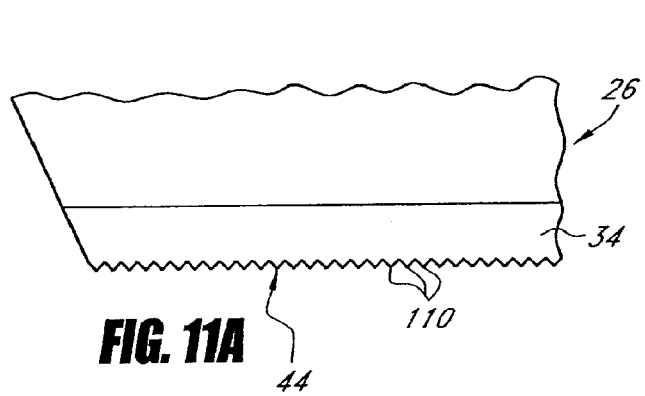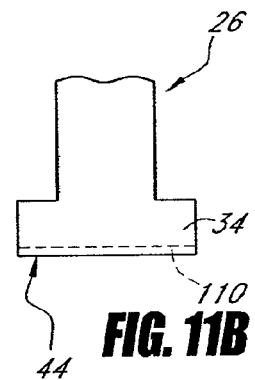
FIG. 11A  FIG. 11B
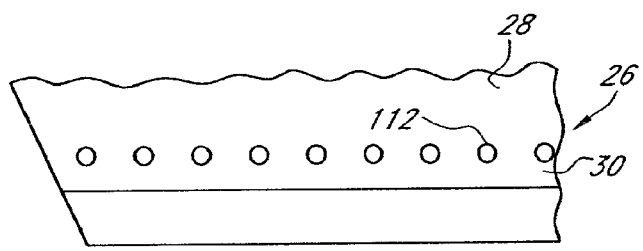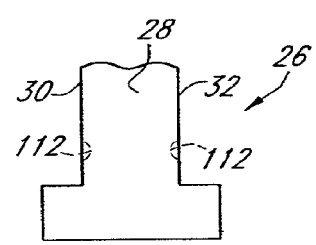
FIG. 12A  FIG. 12B
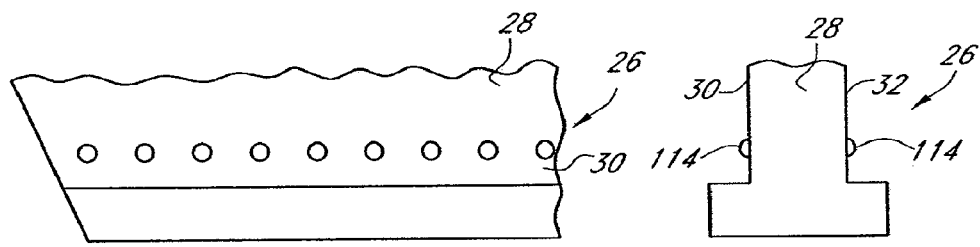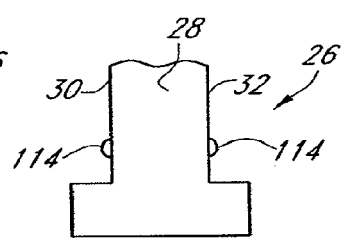
FIG. 13A  FIG. 13B
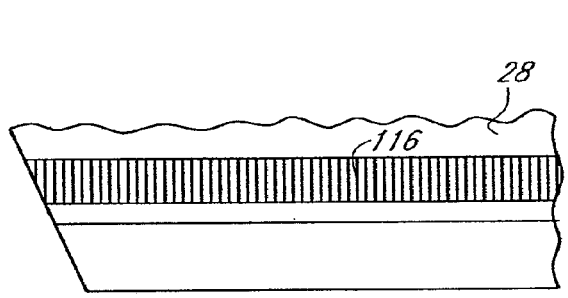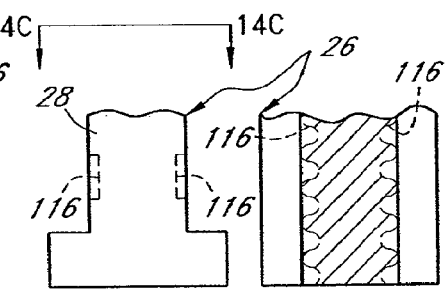
FIG. 14A  FIG. 14B  FIG. 14C

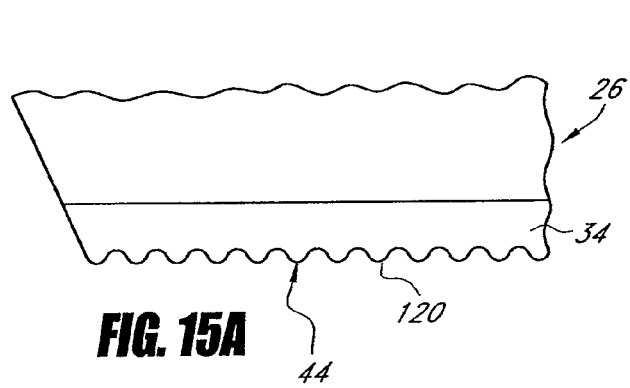
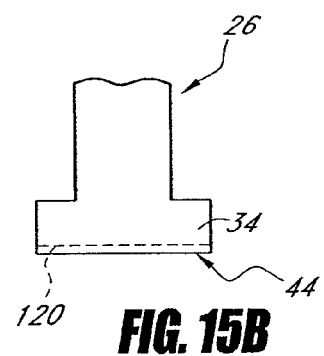
FIG. 15A  FIG. 15B
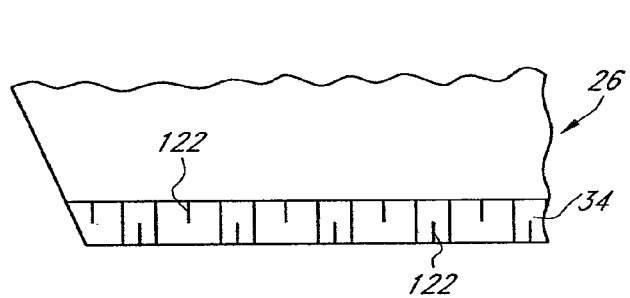
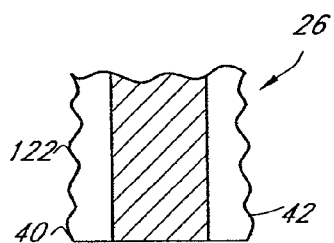
FIG. 16A  FIG. 16B
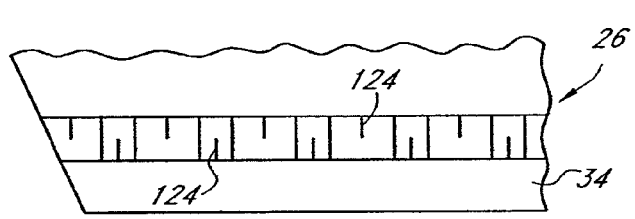
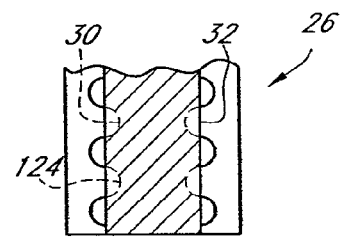
FIG. 17A  FIG. 17B
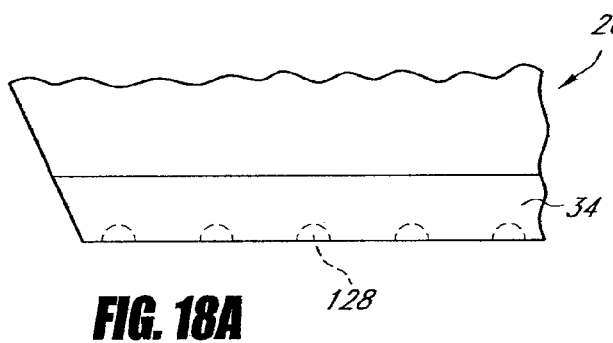
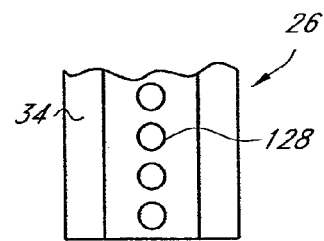
FIG. 18A  FIG. 18B

BICYCLE SEAT CLAMP

RELATED APPLICATIONS

This application is a continuation of U.S. patent application Ser. No. 11/417,663, filed May 3, 2006, pending, which is a continuation of Ser. No. 10/795,070, filed Mar. 5, 2004, now U.S. Pat. No. 7,080,879, which is related to and claims priority from U.S. Provisional Patent Application Nos. 60/494,188, filed Aug. 11, 2003, and 60/452,641, filed Mar. 6, 2003.

INCORPORATION BY REFERENCE

The entireties of U.S. patent application Ser. Nos. 11/417,663, filed May 3, 2006, 10/795,070, filed Mar. 5, 2004, U.S. Provisional Patent Application Nos. 60/494,188, filed Aug. 11, 2003, and 60/452,641, filed Mar. 6, 2003 are hereby expressly incorporated by reference herein and made a part of this specification.

BACKGROUND OF THE INVENTION

1. Field of the Invention

The present invention generally relates to a bicycle seat clamp arrangement and, specifically, to an improved clamp arrangement for a bicycle seat having a beam-style mount.

2. Description of the Related Art

A bicycle seat is typically supported on a seat post, which extends upwardly from the bicycle frame. The seat is secured to the seat post by a clamp assembly, which is fixed on the upper end of the seat post. Typically, the clamp assembly is configured to permit both angular adjustment of the seat, as well as fore and aft adjustment of the seat, relative to the seat post. Thus, the seat may be adjusted relative to the other contact points of the bicycle (e.g., the handlebars and pedals) to enable a rider of the bicycle to achieve a proper fit. A common bicycle seat, or saddle, includes a pair of tubular members, or seat rails, that extend lengthwise in a spaced apart relation on an underneath side of the seat. Each of the seat rails typically includes a substantially linear intermediate section, a portion of which is received by the clamp assembly.

Although the known seat rails, and associated clamp mechanisms, are generally adequate to hold the seat in a desired fore and aft position, numerous disadvantages are associated with the construction of a bicycle seat incorporating seat rails. For example, the seat rails must be cut, shaped and assembled to the base of the seat. Such manufacturing steps are labor intensive and result in the final seat assembly being relatively expensive. In addition, the seat rails often are constructed of a tubular metal material and, accordingly, are relatively heavy. Furthermore, in the event of a crash the seat rails may become bent and, as a result, the seat may become tilted relative to the seat post. In some cases, the seat may become entirely separated from the seat rails in a crash, thus making the seat unusable.

To overcome these disadvantages associated with a typical bicycle seat incorporating tubular seat rails, it has been suggested to provide a bicycle seat having an beam-style mount. Such an arrangement may incorporate a beam (such as an I-beam) running lengthwise beneath the seat. Preferably, the beam is integrally formed with the base of the bicycle seat. Such beam-style mount is lighter and less expensive to produce than traditional seat rails. However, difficulties have been encountered in providing a clamping mechanism that is capable of holding a bicycle seat having a beam-style mount in a desired fore and aft position relative to the seat post.

Accordingly, a need exists for an improved clamping arrangement for use with a bicycle seat having a beam-style mount.

SUMMARY OF THE INVENTION

Accordingly, a preferred embodiment of the present invention involves a bicycle seat clamp arrangement comprising a mounting beam extending below the bicycle seat and defining a first surface. A clamp assembly is configured to apply a clamping force to the mounting beam and defines a second surface. The first and second surfaces are configured to interlock in order to inhibit relative fore and aft movement of the bicycle seat and the clamp arrangement. In one arrangement, the surfaces comprise a plurality of interlocking gear teeth. In another arrangement, the surfaces comprise a plurality of projections and depressions, which may include a roughened surface texture. Furthermore, in certain arrangements, projecting surface features may be present on only one of the seat mount and the clamp and may deform a surface of the other when a clamping force is applied. Preferred embodiments of the present invention are also useful with other types of bicycle seat mounts, including traditional seat rails.

A preferred embodiment is a bicycle seat clamp arrangement including a mounting beam adapted to extend below a bicycle seat. The mounting beam extends lengthwise along the bicycle seat and defines a first length. The mounting beam also defines a first surface. A clamp assembly defines a second length less than the first length such that a position of the mounting beam may be adjusted relative to the clamp assembly. The clamp assembly is configured to selectively apply a clamping force to the mounting beam to hold the mounting beam in a selected position relative to the clamp assembly. The clamp assembly also defines a second surface. Portions of the first surface and the second surface include corresponding interference surface features configured to inhibit relative fore and aft movement of the bicycle seat and the clamp assembly from the selected position when the mounting beam is clamped by the clamp assembly.

A preferred embodiment is a bicycle seat clamp arrangement including a mount adapted to extend in a lengthwise direction below a bicycle seat. The mount has a first mounting surface defining at least one protrusion. A clamp assembly is configured to apply a clamping force to the mount to hold the bicycle seat in a desired position relative to the clamp assembly. The clamp assembly defines a second mounting surface, which defines at least one depression. The at least one depression and the at least one protrusion are sized and shaped to interlock and thereby inhibit relative fore and aft movement of the bicycle seat and the clamp assembly from the desired position.

A preferred embodiment is a bicycle seat clamp arrangement including a mount adapted to extend in a lengthwise direction below a bicycle seat. The mount has a first mounting surface defining at least one depression. A clamp assembly is configured to apply a clamping force to the mount to hold the bicycle seat in a desired position relative to the clamp assembly. The clamp assembly defines a second mounting surface, which defines at least one protrusion. The at least one depression and the at least one protrusion are sized and shaped to interlock and thereby inhibit relative fore and aft movement of the bicycle seat and the clamp assembly from the desired position.

A preferred embodiment is a bicycle seat clamp arrangement including a mounting beam configured to support the bicycle seat. The mounting beam extends lengthwise along a portion of the bicycle seat and includes a web extending downwardly from the bicycle seat and a transverse section below the web. An outer surface of at least one of the web and the transverse section define a first plurality of gear teeth. A clamp assembly includes a first clamp member and a second clamp member. The first and second clamp members define inward-facing surfaces sized and shaped to correspond with the outer surface of the mounting beam. Each of the first and second clamp members define a clamping surface, which together define a second plurality of gear teeth configured to be interlockable with the first plurality of gear teeth. The first and second clamp members are configured to selectively apply a clamping force to the mounting beam to interlock the second plurality of gear teeth with at least a portion of the first plurality of gear teeth to secure the bicycle seat in a desired fore and aft position with respect to the clamp assembly.

A bicycle seat including a mount extending below the seat in a lengthwise direction of the seat. The mount has a first non-smooth mounting surface including a plurality of projecting surface features which have a minimum height of about one-half millimeter.

BRIEF DESCRIPTION OF THE DRAWINGS

These and other features, aspects and advantages of preferred embodiments of the present seat clamp assembly are described in relation to drawings of preferred embodiments, which are intended to illustrate, but not to limit, the present invention. The drawings include 21 figures.

FIG. 1 is a side elevational view of a bicycle seat including an I-beam mount.

FIG. 2 is a seat post including a preferred clamp assembly for applying a clamping force to the mount of the bicycle seat of FIG. 1, as viewed from a rearward end of the seat.

FIG. 3a is a preferred clamp assembly illustrating the clamp in a first angular orientation relative to the seat post. FIG. 3b illustrates the clamp assembly in a second angular orientation relative to the seat post.

FIGS. 7a-7c illustrate a modification of the seat clamp arrangement of FIGS. 1-6, wherein the web of the seat mount includes a plurality of gear teeth. FIG. 7a is a side view of the seat mount, FIG. 7b is a rear view of the seat mount, and FIG. 7c is a cross-sectional view of the seat mount taken along line 7c-7c of FIG. 7b.

FIG. 8 illustrates another modification of the seat clamp arrangement of FIGS. 1-6, wherein the web of the seat mount includes a plurality of X-shaped protrusions.

FIGS. 9a and 9b illustrate yet another modification of the seat clamp arrangement of FIGS. 1-6, wherein the web of the seat mount includes a plurality of through holes. FIG. 9a is a side view of the seat mount and FIG. 9b is a rear view of the seat mount.

FIGS. 10a and 10b illustrate still another modification of the seat clamp arrangement of FIGS. 1-6, wherein the sides of the lower flange of the mount include a plurality of hemispherical depressions. FIG. 10a is a side view of the seat mount and FIG. 10b is a rear view of the seat mount.

FIGS. 11a and 11b illustrate another modification of the seat clamp arrangement of FIGS. 1-6, wherein the lower surface of the bottom flange of the seat mount includes a plurality of gear teeth. FIG. 11a is a side view of the seat mount and FIG. 11b is a rear view of the seat mount.

FIGS. 12a and 12b illustrate yet another modification of the seat clamp arrangement of FIGS. 1-6, wherein the web of the seat mount includes a plurality of hemispherical depressions. FIG. 12a is a side view of the seat mount and FIG. 12b is a rear view of the seat mount.

FIGS. 13a and 13b illustrate still another modification of the seat clamp arrangement of FIGS. 1-6, wherein the web of the seat mount includes a plurality of hemispherical protrusions. FIG. 13a is a side view of the seat mount and FIG. 13b is a rear view of the seat mount.

FIGS. 14a-c illustrate another modification of the seat clamp arrangement of FIGS. 1-6, wherein the web of the seat mount includes a plurality of gear-teeth-shaped depressions. FIG. 14a is a side view of the seat mount, FIG. 14b is a rear view of the seat mount, and FIG. 14c is a cross-sectional view of the seat mount taken along line 14c-14c of FIG. 14b.

FIGS. 15a and 15b illustrate yet another modification of the seat clamp arrangement of FIGS. 1-6, wherein the lower surface of the seat mount bottom flange includes a series of alternating semi-cylindrical protrusions and depressions. FIG. 15a is a side view of the seat mount and FIG. 15b is a rear view of the seat mount.

FIGS. 16a and 16b illustrate still another modification of the seat clamp arrangement of FIGS. 1-6, wherein the side surfaces of the seat mount bottom flange include a series of alternating semi-cylindrical protrusions and depressions. FIG. 16a is a side view of the seat mount and FIG. 16b is a cross-sectional view taken with the upper portion of the seat removed.

FIGS. 17a and 17b illustrate a further modification of the seat clamp arrangement of FIGS. 1-6, wherein the side surfaces of the seat mount web include a series of alternating semi-cylindrical protrusions and depressions. FIG. 17a is a side view of the seat mount and FIG. 17b is a cross-sectional view taken with the upper portion of the seat removed.

FIGS. 18a and 18b illustrate another modification of the seat clamp arrangement of FIGS. 1-6, wherein the lower surface of the seat mount bottom flange includes a plurality of hemispherical depressions. FIG. 18a is a side view of the seat mount and FIG. 18b is a bottom view of the seat mount.

DETAILED DESCRIPTION OF THE PREFERRED EMBODIMENT

Figure 6:
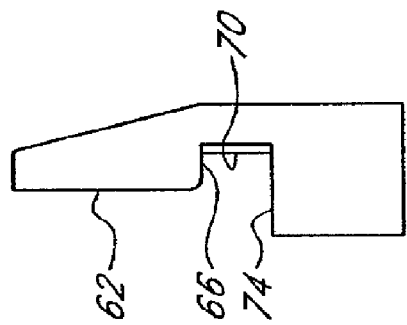
FIG. 6 is an end view of a rearward end of the clamp member of FIG. 4, taken along view line 6-6 of FIG. 4.

FIGS. 1-6 illustrate a preferred embodiment of the present seat clamp arrangement. Preferably, a bicycle seat 20 includes an upper surface, or support surface 22, defined by a seat base 24. The seat base 24 may include padding and a fabric cover, which defines the support surface 22. In other arrangements, the support surface may be defined by the upper surface of a unitary seat base structure. A vertical, central plane $C_P$ generally bisects the seat 20 and extends in a lengthwise direction of the seat 20, as indicated by the arrow $D_L$ in FIG. 1.

An elongated beam-style mount 26 extends along a substantial length of the seat 20 on an underneath side of the seat base 24. Preferably, the mount 26 is generally shaped like an I-beam in transverse cross section and is also bisected by the central plane $C_P$. Thus, the mount 26 includes a vertically extending portion, or web 28, which defines a pair of outwardly facing surfaces 30 and 32. In addition, the mount 26 includes a lower end portion that forms a lower transverse section, or lower flange 34, preferably having a greater lateral width than the web 28. Accordingly, the flange 34 defines upper surfaces 36, 38 on opposing sides of the web 28. The flange 34 also defines opposing outwardly-facing surfaces 40, 42 and a bottom, or downwardly-facing surface 44. The seat base 24 preferably is wider in a lateral direction that the web 28 and, thus, generally creates and upper transverse section, or flange, of the I-beam mount 26.

A clamp assembly 46 is preferably supported on an upper end of a seat post 48. Desirably, the clamp assembly 46 includes left and right clamp members 50, 52, respectively, which cooperate to selectively apply a clamping force to the mount 26. The clamp members 50, 52 may be secured to the seat post 48 through any suitable arrangement. For example, the clamp members 50, 52 may be coupled to a sleeve 54 (FIG. 3) which is press-fit onto, or into, the upper end of the seat post 48. The clamp members 50, 52 preferably are moveable in a lateral direction, as indicated by the arrows L in FIG. 2, to selectively squeeze, or release, the mount 26 therebetween. Any suitable arrangement may be used to apply a squeezing force to the clamp members 50, 52. For example, the clamp members 50, 52 may include one or more through holes, or threaded holes, to accept corresponding threaded fasteners, which may be used to force the clamp members 50, 52 toward one another. Other suitable arrangements apparent to those of skill in the art may also be used.

Desirably, the clamp members 50, 52 include inwardly-facing surfaces 56, 58, respectively, which are configured to generally correspond to the shape the outwardly-facing surfaces of the mount 26. Thus, the clamp members 50, 52 define opposing surface portions 60, 62, which face surfaces 30, 32 of the mount 26. Similarly, surface portions 64, 66 face surfaces 36, 38 of the mount 26; surface portions 68, 70 face surfaces 40, 42 of the mount 26; and surface portions 72, 74 face the downwardly-facing surface 44 of the mount 26. Although the inwardly-facing surfaces 56, 58 of the illustrated clamp members 50, 52 form a generally I-beam shape, in alternative arrangements the surfaces 56, 58 may be configured to conform to beam-style mounts having other cross-sectional shapes.

With reference to FIGS. 3a and 3b, preferably the clamp members 50, 52 are supported relative to the seat post 48 so as to be angularly adjustable relative to the seat post 48 (in the central plane $C_P$). In one arrangement, the clamp members 50, 52 are pivotable about an axis A defined by a support shaft 80 positioned on a forward end of the clamp assembly 46. The clamp assembly 46 also includes an arcuate cutout 82 at a rearward end of the clamp assembly 46 through which another support shaft 84 may be passed. Desirably, the support shaft 84 also interconnects the members 50, 52. The clamp members 50, 52 may be secured relative to the sleeve 54 with the support 84 in any desired position within the cutout 82 to support the seat 20 in a desired angular position relative to the seat post 48. Alternatively, other suitable arrangements for angular adjustment of the seat 20 may also be used, as will be appreciated by one of skill in the art.

Figure 4:
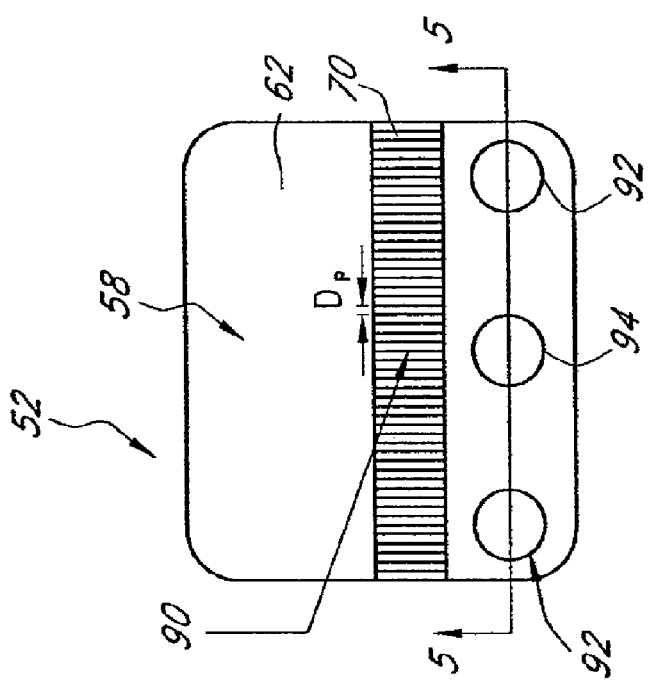
FIG. 4 is a plan view of an inward facing surface of one clamp member of the clamp assembly of FIG. 2.
Figure 5:
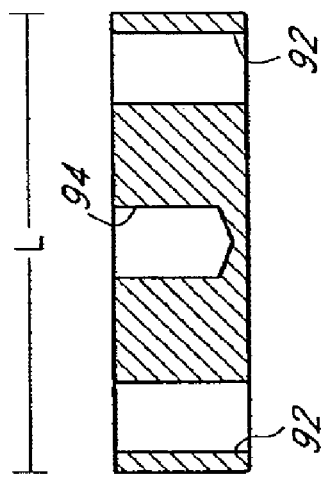
FIG. 5 is a cross-sectional view of the clamp member of FIG. 4, taken along view line 5-5 of FIG. 4.

With reference to FIGS. 4-6, the right clamp member 52 is shown in detail. FIG. 4 illustrates an inward-facing surface 58 of the clamp member 52. As illustrated, preferably, a plurality of gear teeth 90 are defined at least by the surface portion 70 of the clamp member 52. Desirably, a pitch distance $D_p$ of the plurality of gear teeth 90 is equal to about 1 millimeter. Such an arrangement permits a sufficiently precise adjustment of the fore and aft position of the seat 20 relative to the seat post 48. However, other suitable pitch distances $D_p$ may also be used. For example, larger pitch distances may be acceptable when precise fore and aft adjustment is not necessary or desired. Conversely, smaller pitch distances may be used when high precision of the fore and aft adjustment is necessary or desired.

The gear teeth 90 are configured to mate with gear teeth 91 (FIG. 2) provided on the outwardly facing surfaces 40, 42 of the mount 26. When a clamping force is applied to the clamp members 50, 52, the gear teeth 90 and gear teeth 91 interlock to inhibit relative fore and aft movement of the seat 20 relative to the clamp assembly 46. Thus, in the illustrated embodiment, the gear teeth 90 and gear teeth 91 form a plurality of alternating projections and depressions that mate with one another to inhibit slipping, or creeping, of the seat 20 relative to the seat post 48.

Preferably, the gear teeth 90 have a sufficient depth to provide an interference fit between the gear teeth 90 of the mount 26 and gear teeth 91 of the clamp members 50, 52, respectively. That is, the gear teeth 90, 91 mate with one another to create a sufficient resistance to relative movement between the mount 26 and the clamp members 50, 52, along the central plane $C_P$, such that the seat 20 does not move relative to the seat post 48 during normal usage of the bicycle on which they are mounted. In addition, the preferred depths of the gear teeth 90, 91 provide a safety factor to inhibit slippage of the mount 26 relative to the clamp members 50, 52 in the event that the clamp assembly 46 is not adequately tightened. Desirably, the depth of the gear teeth 90, 91 is at least about one-half millimeter. Preferably, the depth of the gear teeth 90, 91 is at least about one millimeter and, more preferably, at least about one and one-half millimeters.

Furthermore, the gear teeth 90 may be disposed on other surfaces of the clamp member 52 and corresponding surfaces of the mount 26 in addition to, or in the alternative, of the surfaces on which the gear teeth 91, 91 are disposed. For example, the surfaces 62, 66 and 74 of the clamp member 52 may also include gear teeth 90. Thus, corresponding surface portions 32, 38 and 44 of the mount 26 similarly may include gear teeth 90. However, providing gear teeth 90 on the surface 70 of the clamp member 52 and surface 42 of the mount 26 (along with gear teeth 90 on surface 68 of the left clamp member 50 and surface 40 of the mount 26) has been determined to be adequate in preventing undesired fore and aft movement of the seat 20 relative to the clamp assembly 46 in common bicycle applications.

In a preferred embodiment, the mount 26 and clamp members 50, 52 are constructed of a plastic material. As such, the overall seat assembly 20 and clamp assembly 46 may be relatively lightweight. Furthermore, manufacture of the seat base 24 is cheaper because the seat base 24 may be injection-molded (or otherwise formed) as a unitary structure. Padding and a cover (if desired) may be secured to the seat base 24 to form a complete seat assembly 20.

However, as described above, difficulties have been encountered in accomplishing a sufficient clamp force to inhibit undesired movement of the seat relative to the clamp assembly 46 with a beam-style mount utilizing smooth clamp surfaces, or planar clamp surfaces. The surface configurations of the preferred embodiments of the present seat mount 26 and clamp assembly 46 overcome these difficulties. Specifically, the preferred embodiments advantageously provide an interference fit between the mount 26 and the clamp assembly 46 to inhibit relative fore and aft movement thereof. The interference fit desirably comprises surface features on surfaces of at least one of the mount 26 and clamp assembly 46 such that a resistive force is developed in response to relative movement therebetween. Preferably, the resistive force is sufficient to inhibit relative movement of the mount 26 and clamp assembly 46 during normal usage of the bicycle on which they are mounted.

The surface features may include a non-uniform roughened surface texture. Further, the surface feature may be present on only one of the mount 26 or clamp assembly 46 and may deform the surface of the other to create an interference fit therebetween. For example, one of the mount 26 or clamp assembly 46 may include a roughened surface texture that deforms the surface of the other under a clamping load. As will be apparent to one of skill in the art in light of the foregoing discussion, such a roughened surface would preferably provide the surface with a roughness average of at least about 32 microinches and, more preferably, at least about 63 microinches. The deformation need only be sufficient to increase the friction between the surfaces to a greater magnitude than the friction between two smooth surfaces of the same material. In addition, the surface feature may be provided by a member separate from the mount 26 or clamp assembly 46, such as a set screw supported by one of the mount 26 or clamp assembly 46 and contacting the other with sufficient force to inhibit movement therebetween.

With reference to FIG. 5, preferably a length L of the clamp member 52 is approximately one-third a length of the mount 26 illustrated in FIG. 1. In a preferred embodiment, the length L of the clamp member 52 is approximately one and three-quarters inches and the length of the mount 26 is approximately five inches. Such an arrangement permits an advantageous amount of fore and aft positioning of the seat 20 relative to the seat post 48 to accommodate a variety of riders of the bicycle on which the seat 20 is mounted. However, in other arrangements, the length of the clamp member 52 may be a lesser or greater proportion of the length of the mount 26. In some instances, it may be desirable for the clamp 52 to be substantially the same length as the mount 26, such as when fore and aft adjustment is provided by the seat post 48 or by some other means.

Desirably the clamp member 52 includes a plurality of through holes 92 positioned below the clamping surfaces 62, 66, 70, 74. Preferably, the through holes 92 are sized and shaped to accommodate the support shafts 80, 84 to permit angular adjustment of the seat 20, as described in relation to FIG. 3. In a preferred arrangement, the through holes 92 are aligned with threaded cavities (not shown) of the clamp member 50 such that threaded ends of the supports shafts 80, 84 may be utilized to apply a clamping force to the clamp members 50, 52. In addition, preferably, the clamp member 52 includes a threaded cavity 94, which cooperates with a through hole (not shown) of the clamp member 50 to permit a clamping force to be applied to the clamp members 50, 52 with, for example, a threaded fastener (not shown). In addition, an alternate number of through holes 92 and/or cavities 94 may be provided, as will be apparent to one of skill in the art. Desirably, clamp member 50 is configured substantially the same as clamp member 52, but is a mirror image thereof.

FIGS. 7-18 illustrate some of the possible alternative arrangements of the mount 26 and the clamp assembly 46. The examples of the surface configurations illustrated in FIGS. 7-18 are not considered to be exhaustive and, accordingly, other surface configurations may be used.

FIGS. 7a-7c illustrate a plurality of gear teeth 100 that extend outwardly from the surfaces 30, 32, or web 28, of the mount 26. Thus, the gear teeth 100 form projections that correspond with depressions 102 of the clamp members 50, 52 to substantially inhibit undesired fore and aft movement of the seat 20. As shown, the gear teeth 100 extend only a portion of the height of the web 28. However, in an alternative arrangement, the gear teeth 100 may extend over a greater portion of the height of the web 28, including extending the entire height of the web 28.

FIG. 8 illustrates the web 28 of the mount 26 having a plurality of X-shaped protrusions 104. Corresponding depressions (not shown) of the clamp members 50, 52 may be provided to interlock with the protrusions 104 and inhibit undesired movement of the seat 20. Alternatively, the web 28 may include depressions and the clamp members 50, 52 include corresponding protrusions.

FIGS. 9a and 9b illustrate a web 28 of a mount 26 having a plurality of through holes 106 extending laterally therethrough. Corresponding protrusions (not shown) of the clamp members 50, 52 may be provided to engage the through holes 106 to inhibit fore and aft movement of the seat 20. The protrusions may be of any suitable shape to interlock with the through holes 106, including semi-cylindrical or hemispherical shapes, for example. Additionally, the through holes 106 may be replaced with cavities that extend only partially through the web 28 from each side.

FIGS. 10a and 10b illustrate a mount 26 having a plurality of hemispherical depressions, or cavities 108, formed into an outward facing surface 40, 42 of the transverse section 34. Corresponding hemispherical projections (not shown) of the clamp members 50, 52 interlock with the cavities 108 to inhibit, or prevent, undesired fore and aft movement of the seat 20.

FIGS. 11a and 11b illustrate a mount 26 having a plurality of gear teeth 110 defined by a downwardly-facing surface 44 of the flange 34. Corresponding gear teeth (not shown) of the clamp members 50, 52 may be provided to interlock with the gear teeth 110. Preferably, the gear teeth 110 each extend substantially perpendicular to the central plane $C_P$ (FIG. 2), that is, across the width of the flange 34.

FIGS. 12a and 12b illustrate a mount 26 having hemispherical depressions 112 formed by outwardly facing surfaces 30, 32 of the web 28. Corresponding hemispherical protrusions (not shown) of the clamp members 50, 52 preferably are provided to interlock with the depressions 112. Alternatively, the depressions 112, and corresponding protrusions, may take on shapes other than hemispherical and still function to interlock and inhibit, or prevent, fore and aft movement of the seat mount 26 relative to the clamp members 50, 52.

FIGS. 13a and 13b illustrate a mount 26 having a plurality of hemispherical protrusions 114 defined by outwardly facing surfaces 30, 32 of the web 28. Corresponding hemispherical depressions (not shown) of the clamp members 50, 52 may be provided to interlock with the protrusions 114. Alternatively, the protrusions 116, and corresponding depressions, may take on shapes other than hemispherical and still function to interlock and inhibit, or prevent, fore and aft movement of the seat mount 26 relative to the clamp members 50, 52.

FIGS. 14a-14c illustrate a mount 26 having a plurality of gear teeth-shaped depressions 116 formed on outwardly facing surfaces 30, 32 of the web 28. Corresponding gear teeth-shaped protrusions (not shown) of the clamp members 50, 52 interlock with the depressions 116 to inhibit undesired movement of the seat 20. Although the illustrated depressions 116 extend only a portion of the height of the web 28, in alternative arrangements the depressions 116 may extend along a greater portion of the height of the web 28, such as the entire height, for example.

FIGS. 15a and 15b illustrate a mount 26 including a series of semi-cylindrical protrusions 120 defined by a downwardly-facing surface 44 of the transverse section 34. Corresponding depressions (not shown) of the clamp members 50, 52 may be provided to interlock with the protrusions 120.

FIGS. 16a and 16b illustrate a mount 26 having a plurality of semi-cylindrical protrusions 122 defined by outwardly-facing surfaces 40, 42 of the transverse section 34. In the illustrated arrangement, the protrusions 122 extend the entire height of the outwardly-facing surfaces 40, 42, however, in other arrangements the protrusions 122 may extend only a portion of the height of the outwardly-facing surfaces 40, 42.

FIGS. 17a and 17b illustrate a mount 26 having a plurality of semi-cylindrical protrusions 124 defined by outwardly-facing surfaces 30, 32 of the web 28. Corresponding depressions (not shown) of the clamp members 50, 52 may be provided to interlock with the projections 122 or 124. In the illustrated arrangement, valleys 125 between the protrusions 124 extend to a depth beyond the outward surfaces 30, 32 of the web 28.

FIGS. 18a and 18b illustrate a mount 26 having a plurality of hemispherical depressions 128 defined by a downwardly facing surface 44 of the transverse section 34. Corresponding hemispherical protrusions (not shown) of the clamp members 50, 52 may be provided to interlock with the depressions 128. Although only one row of depressions 128 is shown, alternative arrangements may include more than one row of depressions 128.

Figure 19:
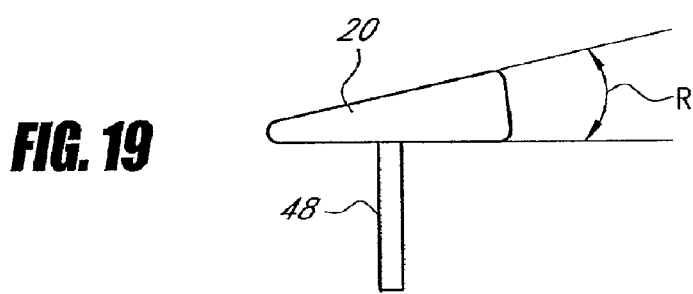
FIG. 19 is a schematic, side view of a seat and seat post illustrating a condition in which rocking of the seat relative to the seat post may occur.

FIG. 19 schematically illustrates a condition in which the seat 20 may pivot or "rock" with respect to the seat post 48. Typically, the rocking motion of the seat 20 takes place in the central plane $C_P$ (FIG. 2), as illustrated by the arrow R in FIG. 19. However, in addition, or in the alternative, rocking motion may also be present in a direction transverse to the central plane $C_P$.

In some instances, the above-described designs may permit such rocking motion of the seat 20 with respect to the seat post 48. It is suspected that the rocking motion is permitted due to an imperfect fit between the mount 26 and the clamp members 50, 52. Such an imperfect fit may be the result of normal manufacturing variations, such as normal machining variations or normal material shrinkage in a molding process. Due to normal manufacturing variations, a space, or gap, may exist between the respective mating surfaces of the mount 26 and the clamp members 50, 52. In some instances, the gap may be sufficient to permit rocking motion of the seat 20 with respect to the seat post 48. Although the movement may be relatively small, it may nonetheless be an aggravation to a rider of the associated bicycle.

Figure 20:
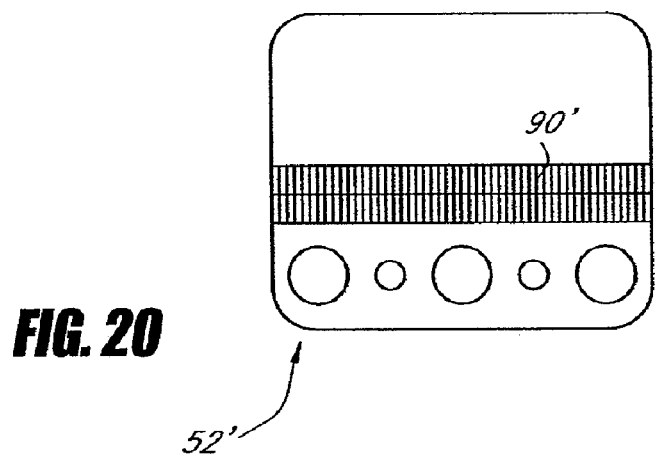
FIG. 20 is a side view of an inside surface of a modification of the right seat clamp member of FIGS. 2-6, a portion of which includes a plurality of gear teeth having a wedge configuration.
Figure 21:
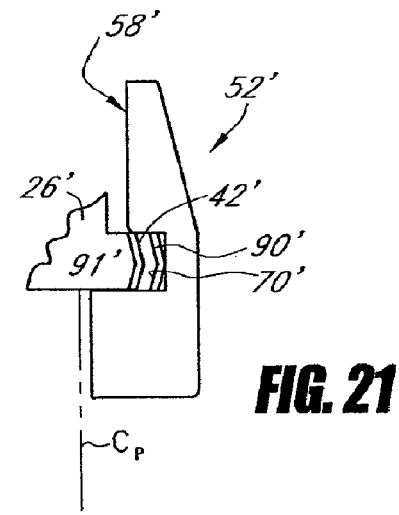
FIG. 21 is a rear view of the right seat clamp member of FIG. 20.

FIGS. 20 and 21 illustrate a modified clamp member, referred to by the reference number 52'. The clamp member 52' is substantially similar to the clamp member 52 and, thus, like reference numerals are used to refer to like components or features, except a prime (') is added.

The surface 70' of the clamp member 52' includes a plurality of gear teeth 90', which preferably are configured to mate with corresponding gear teeth 91' of a seat mount 26' (FIG. 21). Alternatively, other interlocking surface features may be provided on the clamp member 52', such as those disclosed above in connection with FIGS. 7-18.

Desirably, the surface 70' is generally V-shaped and concave when viewing the inward-facing surface 58'. Thus, the surface 70' forms a double-wedge shape. That is, the surface 70' includes two portions that are offset from, or form an angle with, the central plane $C_P$ in the vertical direction. The double-wedge shape of the surface 70' is configured to cooperate with a convex, V-shaped surface 42' of the seat mount 26', which includes the gear teeth 91'. Thus, despite variations in the size of the surfaces 42', 70' that may result in an imperfect fit between the clamp member 52' and the mount 26', upon clamping of the mount 26', the points of the V-shaped surfaces 42', 70' are urged into alignment. The interference of the wedges of the surface 42' of the mount 26' with the wedges of the surface 70' of the clamp member 52' inhibit, if not entirely prevent, rocking of the seat 20 relative to the seat post 48.

In an alternative arrangement, the surfaces 42', 70' may include only a single wedge, that is, the surfaces 42', 70' may define only a single angle with respect to the central plane $C_P$ (instead of a V-shape) and the surface 42' may be urged to toward the top (or bottom, depending on the direction of the angle) of the surface 70'. Similarly, rocking motion would be inhibited, if not prevented, with such a single wedge surface configuration. Furthermore, the wedge surface configuration may be provided on other complementary surfaces of the clamp member 52' and mount 26' in addition, or in the alternative, to the surfaces 42' and 70'. In some arrangements, the wedge surface configuration may be provided on separate surfaces than the surfaces that include surface features to inhibit fore and aft movement of the seat 20 relative to the seat post 48.

Although the present invention has been described in the context of certain preferred embodiments, it is not intended to limit the invention to the disclosed bicycle seat clamp arrangements. Changes apparent to one of skill in the art may be made without departing from the spirit and scope of the present invention. For example, although the illustrated embodiments include surfaces having well-defined gear teeth, or protrusions and depressions, other embodiments may employ roughened (i.e., non-smooth or unfinished) surfaces to increase surface friction between the mount 26 and the clamp members 50, 52. Furthermore, although two clamp members 50, 52 are shown, other suitable types of clamps assemblies may also be used. Accordingly, the invention should be defined only by the claims that follow.

What is claimed is:

1. A bicycle seat clamp arrangement, comprising:
    a mount adapted to extend in a lengthwise direction below a bicycle seat, said mount having a first mounting surface defining at least one protrusion and a third mounting surface defining at least one protrusion;
    a clamp assembly configured to apply a clamping force in a lateral direction to said mount to hold said bicycle seat in a desired position relative to said clamp assembly, said clamp assembly comprising a first clamp member and a second clamp member which receive the mount therebetween, wherein said first clamp member defines a second mounting surface defining at least one depression and said second clamp member defines a fourth mounting surface defining at least one depression;
    wherein said at least one depression of said second mounting surface and said at least one protrusion of said first mounting surface are sized and shaped to interlock and said at least one depression of said fourth mounting surface and said at least one protrusion of said third mounting surface are sized and shaped to interlock and thereby inhibit relative fore and aft movement of the bicycle seat relative to said clamp assembly from said desired position;
    wherein said first and second mounting surfaces and said third and fourth mounting surfaces comprise complementary wedge shapes that define an oblique angle relative to said first direction to inhibit rocking of said bicycle seat relative to said clamp assembly.

2. The bicycle seat clamp arrangement of claim 1, wherein said mount comprises a beam having a web and a transverse section below said web, wherein said at least one protrusion of said first mounting surface is defined by an outer surface of one of said web and said transverse section on a first side of said mount and said at least one protrusion of said third mounting surface is defined by an outer surface of one of said web and said transverse section on a second side of said mount.

3. A bicycle seat and clamp assembly, comprising:

a mounting beam configured to support the bicycle seat, the mounting beam extending lengthwise along a portion of the bicycle seat, the mounting beam comprising a web extending downwardly from the bicycle seat and a transverse section below said web, wherein an outer surface of at least one of said web and said transverse section define a first plurality of gear teeth;

a clamp assembly comprising a first clamp member and a second clamp member, said first and second clamp members defining inward-facing surfaces sized and shaped to correspond with said outer surface of said mounting beam, each of said first and second clamp members defining a clamping surface which together define a second plurality of gear teeth configured to be interlockable with said first plurality of gear teeth;

wherein said first and second clamp members are configured to selectively apply a clamping force to said mounting beam to interlock said second plurality of gear teeth with at least a portion of said first plurality of gear teeth to secure the bicycle seat in a desired fore and aft position with respect to said clamp assembly and inhibit longitudinal movement of said bicycle seat relative to said clamp assembly;

wherein said first plurality of gear teeth are disposed on outward facing surfaces of said transverse section and said second plurality of gear teeth are disposed on a portion of said first and second clamp members corresponding to said outward facing surfaces; and a seat post that supports the clamp assembly, wherein the first and second clamp members are rotatable about an axis relative to said seat post to permit adjustment of an angular orientation of said bicycle seat relative to said seat post.

* * * * *